(12) United States Patent
Chung et al.

(10) Patent No.: US 6,520,517 B1
(45) Date of Patent: Feb. 18, 2003

(54) RIDING DEVICE

(75) Inventors: Rasyad Chung, Berkeley, CA (US); Caleb Chung, Boise, ID (US)

(73) Assignee: Nextsport, Berkeley, CA (US)

( * ) Notice: Subject to any disclaimer, the term of this patent is extended or adjusted under 35 U.S.C. 154(b) by 0 days.

(21) Appl. No.: 10/015,375

(22) Filed: Dec. 12, 2001

Related U.S. Application Data

(60) Provisional application No. 60/293,815, filed on May 25, 2001.

(51) Int. Cl.[7] ............................................. B62M 1/12
(52) U.S. Cl. ........................ 280/87.042; 280/124.11
(58) Field of Search ..................... 280/87.01, 87.041, 280/87.042, 87.043, 87.05, 263, 267, 124.11, 124.177

(56) References Cited

U.S. PATENT DOCUMENTS

| | | | | | |
|---|---|---|---|---|---|
| 2,330,147 A | * | 9/1943 | Rodriguez | ............. | 280/87.041 |
| 3,992,029 A | * | 11/1976 | Washizawa et al. | ........ | 280/221 |
| 4,526,390 A | * | 7/1985 | Skolnik | ................. | 280/87.041 |
| 4,775,162 A | * | 10/1988 | Chao | ..................... | 280/87.041 |
| 5,165,711 A | * | 11/1992 | Tsai | ...................... | 280/87.041 |
| 6,142,493 A | * | 11/2000 | Wang et al. | ........... | 280/87.041 |
| 6,155,553 A | * | 12/2000 | Wang et al. | ........... | 270/87.041 |
| 6,182,985 B1 | * | 2/2001 | Wang et al. | ........... | 280/87.041 |
| 6,286,843 B1 | * | 9/2001 | Lin | ......................... | 280/11.28 |
| 6,341,790 B1 | * | 1/2002 | Chen | .................... | 280/87.041 |
| 6,382,646 B1 | * | 5/2002 | Shaw | .................... | 280/87.041 |

FOREIGN PATENT DOCUMENTS

| | | | | | |
|---|---|---|---|---|---|
| FR | 2614002 | * | 4/1987 | ............ | 280/87.041 |
| GB | 2048180 | * | 12/1980 | ............ | 280/87.041 |

* cited by examiner

*Primary Examiner*—Brian L. Johnson
*Assistant Examiner*—Bridget Avery
(74) *Attorney, Agent, or Firm*—Jackson Walker L.L.P.

(57) ABSTRACT

A riding device includes a deck upon which a rider can be supported. Front and rear road wheels provide independent steering upon tilting or banking of the deck in use. A steering column is connected to the front wheels to provided additional steering control. The steering column tilts in unison with the deck and provides no steering effect upon deck pivoting alone.

12 Claims, 5 Drawing Sheets

RIDING DEVICE

This application claims priority to U.S. Provisional Patent Application Serial No. 60/293,815, filed May 25, 2001.

BACKGROUND OF THE INVENTION

The present invention is directed to a riding device. Scooters, as for example, two-wheeled scooters having two small wheels in tandem have limitations in their operation.

Like bicycles the steering and stability of two wheeled scooters is largely defined by the size, shape, and motion of the contact patch (the contact area between wheel and the ground) of the front wheel in relation to the steering axis.

Bicycles with wheel diameter greater than 20 inches (about 51 cm) allow for design that incorporates both forward offset (locating the front wheel axle longitudinally ahead of the steering axis) and trail (distance between the contact patch and the projected point of the steering axis on the ground). The successful bicycle design balances forward offset with trail to produce steering with both low speed maneuverability and high speed stability.

Unlike bicycles, however, scooters have very small, relatively hard wheels. Because of the small wheel size and relatively poor traction characteristics, scooters with bicycle like steering column and fork arrangements result in design compromises that favor low speed manoeuvrability and maintaining vertical orientation of the steering axis to the ground.

Because of the wheel hardness and relatively small area of contact between the wheels and the pavement, feedback about both steering response and available traction of such scooters is limited. Rapid and uneven wear of scooter wheels further contributes to poor handling and feedback.

Limitations of existing skateboard truck design require a compromise between low speed maneuverability (ease of turning) and high speed stability. Furthermore, conventional skateboard trucks utilize springs or plastic or rubber grommets that help return the skateboard deck to a neutral (not banked) position. Consequently, when downward force is applied to the lateral edge to the bank the deck and steer, some portion of that force is transferred to the inside wheels resulting in unbalanced force distribution between the inside and outside wheels. On a skateboard this force differential between the inside and outside wheels is difficult to control and limits the ultimate traction available when turning.

Skateboards utilize deck lean to control steering of both the front and rear trucks simultaneously. Normal steering requires downward force be applied toward the lateral edge of the skateboard deck which in turn banks and initiates steering of both trucks in proportion to the magnitude of deck banking. Dynamic balance must be developed in order to maintain forward and rear stability, and to master basic skills such as mounting, dismounting, pushing, braking, and turning. Pushing and braking require the rider learn to balance and steer with only one foot. Turning, for further example, requires the rider learn to latterly shift their center of mass toward the inside of the upcoming turn in advance of initiating steering. Subsequent stability during the turn is conditional on the rider correctly judging and maintaining the optimum vector of their centre of mass with the skateboard for all combinations of turn radius and speed. Advanced manoeuvres such as sliding, jumping and grinding are even more difficult to master. Consequently, learning to ride a skateboard is a very difficult challenge.

Limitations of existing skateboard truck design require a compromise between low speed manoeuvrability (ease of turning) and high speed stability. Furthermore, conventional skateboard trucks utilize springs or plastic or rubber grommets that help return the skateboard deck to a neutral (not banked) position. Consequently, when downward force is applied to the lateral edge to bank the deck and steer, some portion of that force is transferred to the inside wheels resulting in unbalanced force distribution between the inside and outside wheels. On a skateboard this force differential between the inside the outside wheels is difficult to control and limits the ultimate traction available when turning.

Thus, a riding device is desired that overcomes the operation limitations found on scooters and skateboards.

OBJECTS OF THE INVENTION

It is an object of the present invention to overcome or substantially ameliorate the above disadvantages.

It is a further object of the present invention to provide an improved riding device.

It is a further object of the present invention to provide a riding device having improved low speed manoeuvrability.

It is a further object of the present invention to provide a riding device having improved high speed stability.

It is a further object of the present invention to provide a riding device having improved control over traction of the wheels with the ground.

DISCLOSURE OF THE INVENTION

There is disclosed herein a riding device for riding upon a surface, comprising:
 a deck upon which a rider can be supported,
 a rear road wheel or wheels attached to the deck,
 a steering column having a longitudinal axis, the column being attached to the deck to pivot about said longitudinal axis, yet remain at a fixed angle with respect to the deck as the deck tilts in use,
 a front truck supporting two laterally spaced front road wheels, the front truck being pivotally mounted to the steering column such that the front truck pivots about said longitudinal axis in unison with the steering column and pivots about an axis normal to said longitudinal axis such that the two front road wheels remain in contact with the surface upon tilting movement of the deck and steering column in use, the front truck and front road wheels providing no steering effect upon tilting of the deck and steering column in use unless the steering column is pivoted about said longitudinal axis.

There is further disclosed herein a riding device for riding upon a surface, comprising:
 a deck upon which a rider can be supported,
 a rear road wheel or wheels attached to the deck,
 a steering column having a longitudinal axis, the column being attached to the deck to pivot about said longitudinal axis, yet remain at a fixed angle with respect to the deck as the deck tilts in use,
 a front truck supporting two laterally spaced front road wheels, the front truck being pivotally mounted to the steering column such that the front truck pivots about said longitudinal axis in unison with the steering column and pivots about an axis normal to said longitudinal axis such that the two front road wheels remain in contact with the surface upon tilting movement of the deck and steering column in use, the front truck receiving no necessary transmission of torque from said steering column about said normal axis upon tilting of the deck and steering column in use, thereby promoting a balanced force distribution to each front road wheel in use.

Preferably, the device comprises a pair of said rear road wheels pivotally attached to the deck and providing a steering effect upon tilting of the deck in use.

Preferably the rear wheels are attached to a rear truck.

Preferably the rear truck pivots about an inclined axis.

Preferably, the device includes a spring extending between the rear truck and the deck to bias the truck into a straight tracking alignment with the deck.

Preferably the spring is a bar extending substantially longitudinally of the deck and located at a mid position thereof with respect to the deck.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
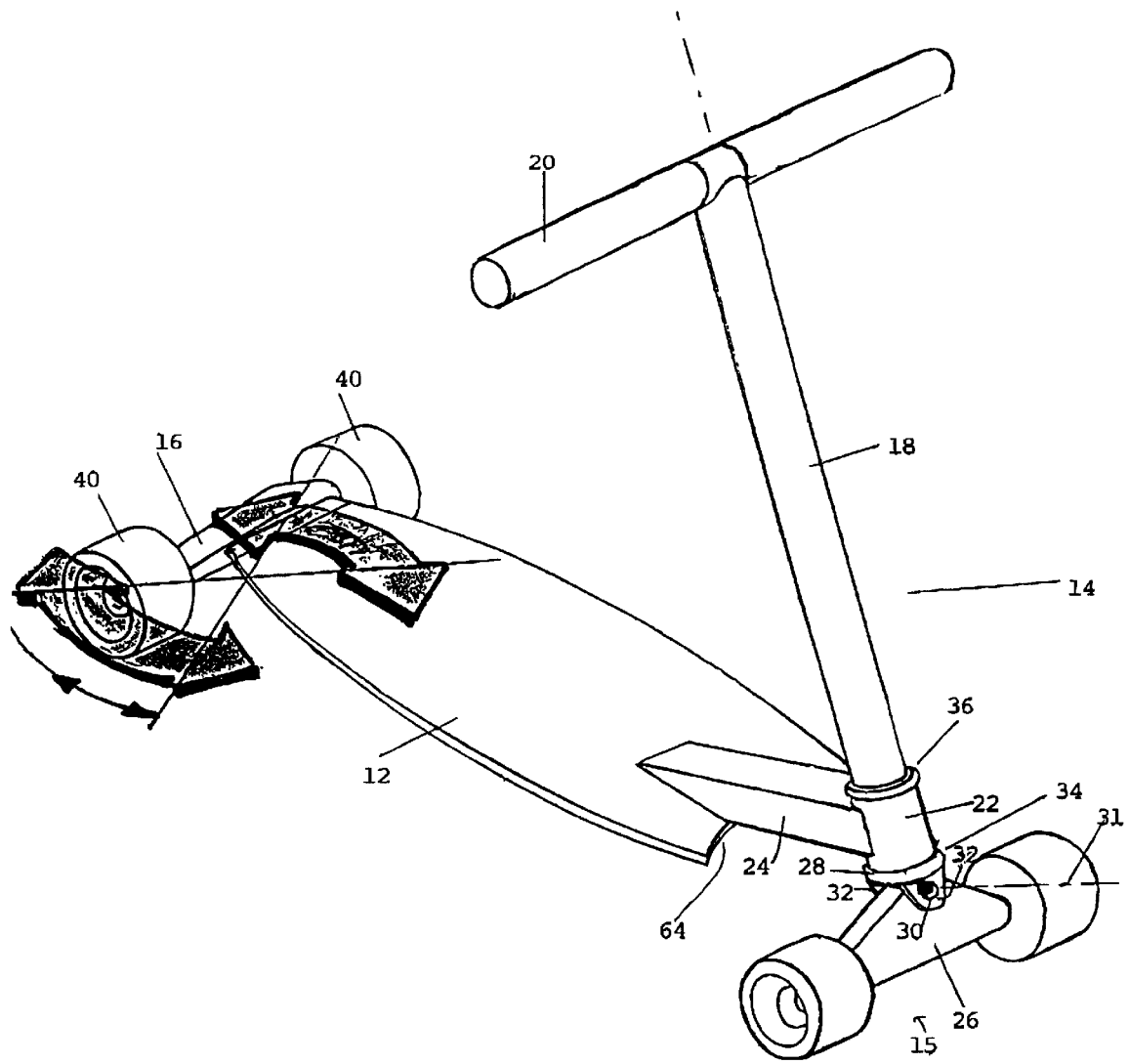
FIG. 1 is a perspective view of a riding device.

A riding device is provided that overcomes the riding limitations provided by scooters and skateboards. In the exemplary embodiment shown in FIG. 1, the device comprises a deck 12 coupled to a rear wheel truck 16 and to a steering system 14 for steering both a front wheel truck 15 and the rear wheel truck 16. The steering system comprises a steering column 18 from which extend a steering handle 20. The steering column may be of the extendible type that can telescope from a shorter length to a longer length. In the exemplary embodiment shown in FIG. 1, the steering column is rotationally fitted through a cylindrical member 22 coupled to a neck 24 extending from the deck 12. The steering column is pivotally coupled about a pivot axis 31 to the front wheel truck 15. A portion of the deck proximate the neck is removed forming a cut-out 64. The neck 24 and the deck cut-out 64 are designed to eliminate interference of the rotation of the front wheel truck 15 at all combined angles of deck lean and front truck steering. This configuration allows the rider to independently steer the front and rear trucks.

The front truck 15 comprises an axle member 26 that is pivotally coupled to the steering column 18. While the axle member 26 can have multiple shapes, in the exemplary embodiment the axle member 26 has a generally triangular shape in front elevational view. In the exemplary embodiment, a channel shaped member 28 extends from the end of the column 18 opposite the handle. The channel member has two leg portions 32 defining the channel there between. The axle member 26 is fitted within the channel member 28. A pin 30 penetrates the leg portions 32 of the channel member and the axle member 26 about pivot axis 31, thereby pivotally coupling the axle member to the channel member and to the column 18. The exemplary embodiment axle member 26 can easily pivot relative to the channel member resulting in even force to both front wheels at all times and freedom of steering independent 14 of deck lean and rear truck steering.

Figure 3:
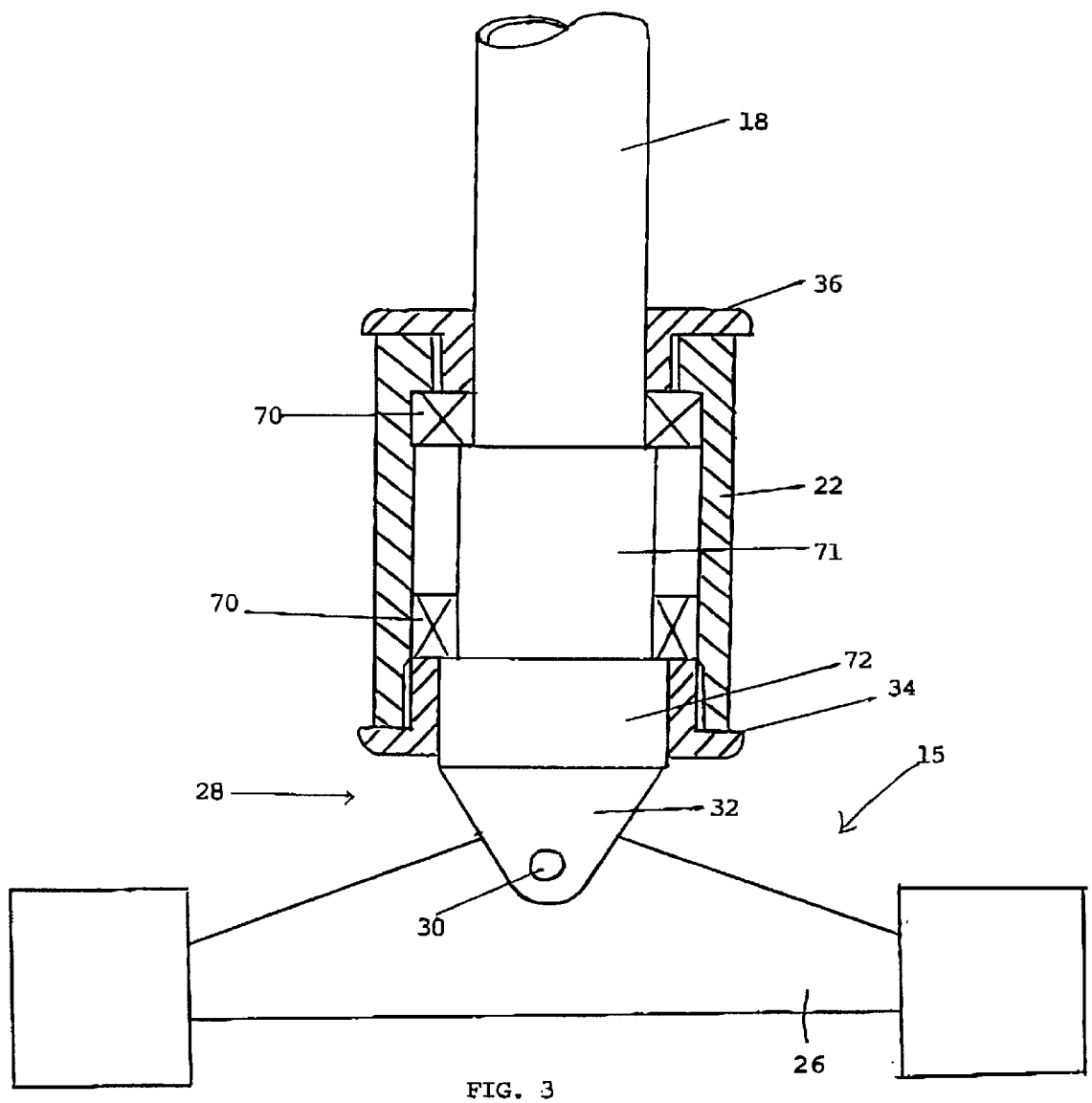
FIG. 3 is a cross-sectional front elevational view of the bottom portion of a steering column and front axle of the riding device.

As shown in FIG. 3, a base portion 34 of the channel member has dimension preferably greater than the inner diameter of the cylindrical member 22 so as to prevent the column and channel member from withdrawing from the cylindrical member 22. A cylindrical cap 36 is mated the cylindrical member 22 and in surrounding relationship to the column 18 for assisting in retaining the steering column relative to the cylindrical member and preventing the column from being withdrawn from the cylindrical member in the direction towards to the axle member. The column 18 may be mated to the cylindrical member 22 in the same way as a bicycle steering fork is mated to a bicycle frame. For example, bearings 70 may be incorporated within the cylindrical member and its surrounding relationship to the column 18. Furthermore, to retain the column within the cylindrical member 22, the column may be formed with larger diameter sections 71, 72 within the cylindrical member 22.

In the exemplary embodiment shown in FIG. 1, the rear truck 16 is mounted to the deck such that banking of the deck 12 and the steering column 18 as a single unit will cause the rear wheels 40 mounted on the rear truck 16 to turn and results in rear wheel steering.

Figure 2:
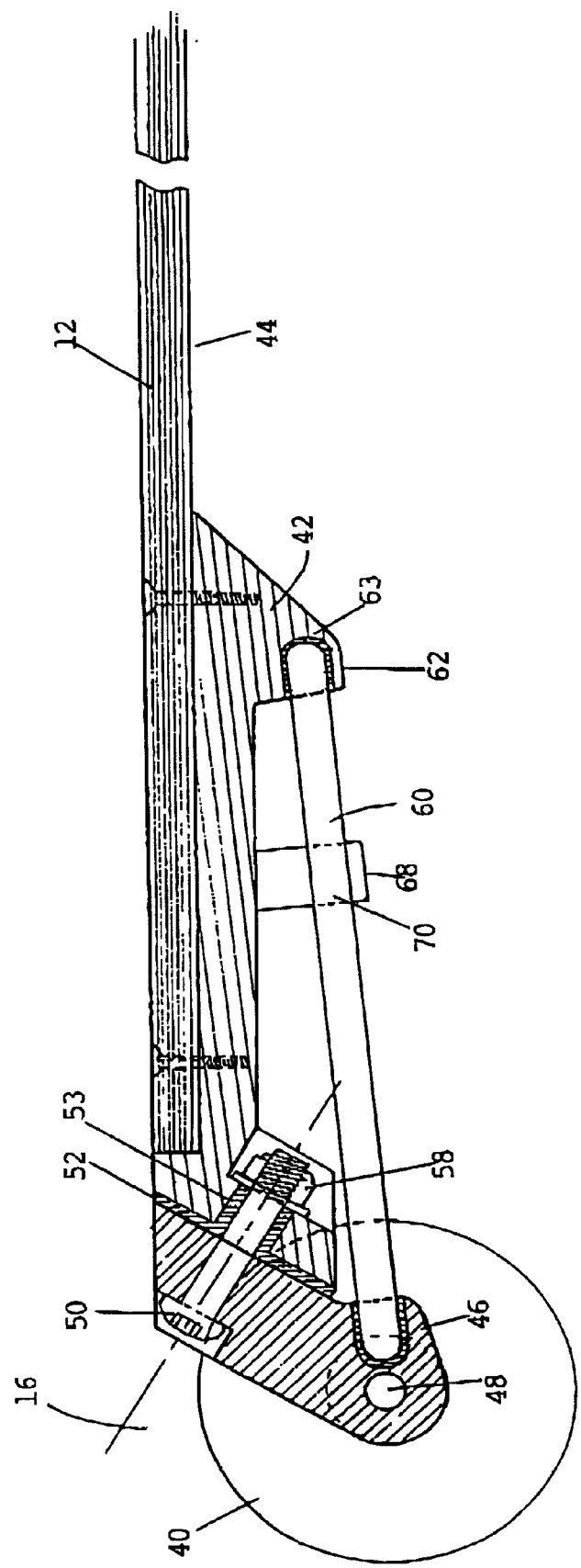
FIG. 2 is a partial cross sectional elevation of the rear portion of the device shown in FIG. 1 depicting the rear truck.

In the exemplary embodiment shown in FIG. 2, the rear truck 16 comprises a base plate 42 mounted to an underside 44 of the deck and a rear hanger 46 rotatably coupled to the base plate. The rear hanger carries a rear axle 48 on to which are mounted the rear wheels 40. In the exemplary embodiment, the rear hanger is bolted to the base plate by a bolt 50 and a lock nut 58. A bearing plate 52 is sandwiched between the base plate and the rear hanger. The bearing plate allows the rear hanger to rotate smoothly relative to the base plate. The rear hanger interfaces with the base plate along an interface plane contiguous with the bearing plate. The interface plane is angled relative to the deck at an angle preferably of about 45°. This angle allows the rear hanger to rotate when the deck is banked in a direction opposite the bank. The bearing plate may also cover an opening 53 in the base plate accommodating the bolt 50. This further enhances the ability of the rear hanger to rotate relative to the base plate and allows deck to lean/banking in excess of 40°. Furthermore, the clamping force provided by the bolt and lock nut is such that it allows the rear hanger to rotate relative to the base plate.

A spring bar 60 running longitudinally relative to the deck is coupled to the base plate at end portion 62 of the base plate opposite the rear hanger and is coupled to the rear hanger. In the exemplary embodiment, shown in FIG. 2, the spring bar is fitted in an opening 63 formed in the end portion 62 of the base plate and to an opening 65 formed on the rear hanger. A slotted base plate portion 68 having a slot 70 extends from the base plate for providing support to the spring bar. The spring bar is fitted within the slot 70.

As the deck is banked in one direction, the rear truck with wheels 40 turn in the opposite direction, this in turn causes the spring bar to deflect which generates a spring force. As the deck is levelled again, the spring force generated to the spring bar assists in returning the rear hanger to the neutral position, i.e., the position where the wheels are not turned relative to the deck.

Figure 4:
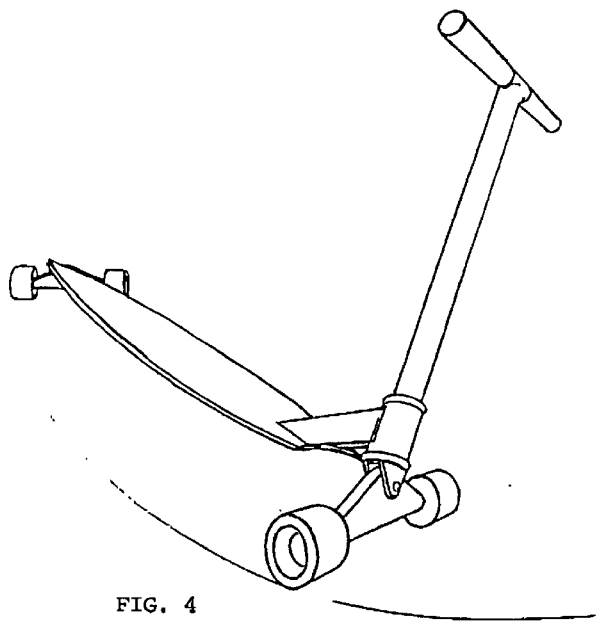
FIGS. 4, 5 and 6 are schematic perspective illustrations of the device in use.
Figure 5:
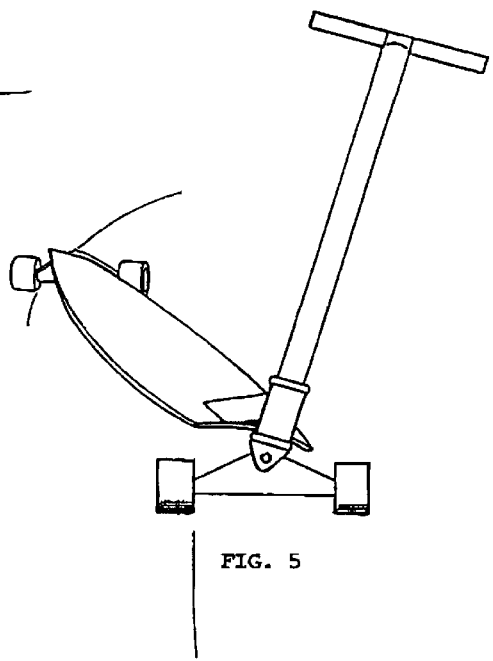
Figure 6:
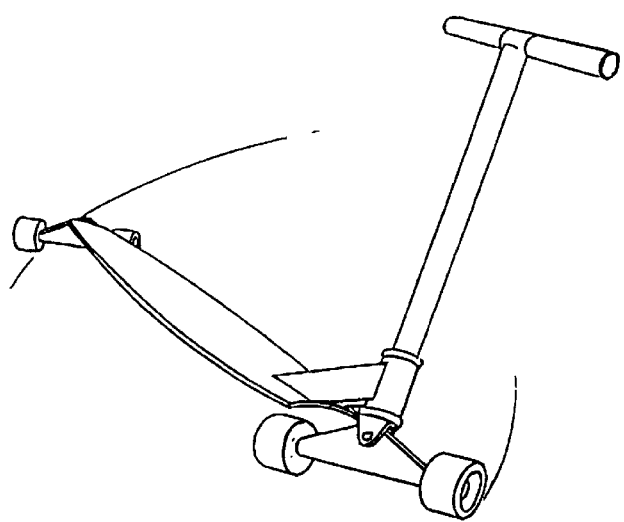
Figure 7:
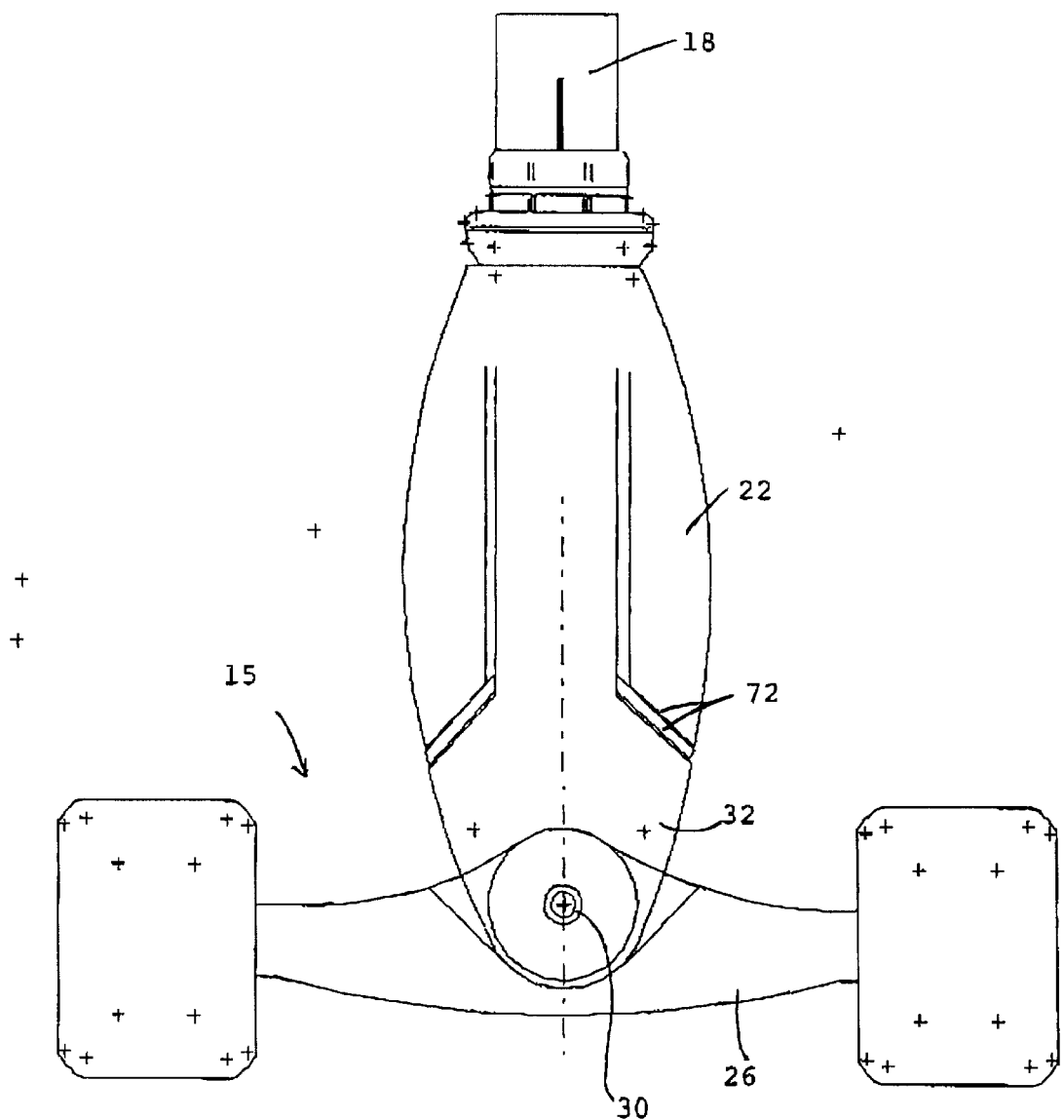
FIG. 7 is a front elevational view of an alternative bottom portion of a steering column and front axle of the riding device.

With the preferred embodiment independent control is provided for steering both the front and rear wheels. Rear truck steering is controlled by rolling the steering column 18 and banking the deck as a single unit which a produces a lean steering of the rear truck. FIGS. 4, 5 and 6 each show the rear truck turned the same way as a result of this type of deck banking. Consequently, the rider's balance on the device is assisted because the steering column's central longitudinal axis remains fixed relative to the deck. This provides for forward and rear stability, i.e., the rider can use the steering handle to balance as he encounters terrain changes altering acceleration and declaration forces, and also provides an aid to maintain alignment of the rider's center of mass in relation to the deck since the position of the steering column is fixed relative to the deck. Furthermore with the inventive device the rear wheels steer to the outside of the turn subtly aligning the rider's center of mass in relation to the future centrifugal forces to be encountered while on a turn. Additionally, the rear truck follows a wider track around the turn than the front truck which results in a more stable platform than the tandem tracks of a skateboard. Moreover, the steering column and steering handle provide a long moment that stabilizes oscillations of deck lean that may originate from wheel ground interaction, as well as from adjustments of the rider's position as for example shifting of the rider's feet and balance. As a result the device provides exceptional feedback to the rider about the device's attitude in the turn. The independent steering of the inventive device provides improved low speed manoeuvrability and significant stability at high speeds.

With the inventive device, a rider can turn with any combination of lean steering of the rear truck and rotational steering of the front truck, as for example shown in FIG. 4, FIG. 5, and FIG. 6. In other words, the deck can be banked while the steering column is rotated. Because front steering is not affected by deck lean the offset of the front truck to the steering column central axis may be adjusted as necessary to provide optimum trail for high speed stability without compromising low speed maneuverability. This is unlike common scooters where steering occurs with the front wheel only and progressively less steering is possible as the scooter is banked over. This is unlike skateboards where the steering is linked and independent steering control of the front and rear is not possible. Additionally, with the inventive device the traction characteristics of the front truck and rear truck are different. With the inventive device the front wheels maintain balanced force distribution at all times which results in optimum front wheel traction. In contrast, the rear truck functions like a conventional skateboard truck with regard to traction characteristics. With the rear truck, increased deck lean results in loss of traction as force differential is increased to the inside rear wheel. In addition rear truck steering results in loss of traction as speed increases. Independent control of the rear truck allows the rider to precisely control the loss of traction of the rear wheels while maintaining optimum traction of the front wheels.

Consequently, with the inventive device it is possible for the rider to make effective steering adjustments during sliding or loss of traction of the rear wheels and allows the rider to do tricks which cannot be done with scooters or skateboards. For example as shown in FIG. 9, the device can be made to travel sideways, by banking the deck in one direction and turning the steering in the opposite direction. Moreover, the rear of the device may be made to turn a rate faster than the front of the device as for example shown in FIG. 10, or at a rate slower than the front of the device.

In an alternative configuration (not shown) the device might be formed with a single front wheel and a rear truck that provides for independent steering as described above. With this example, the front wheel behaves like a conventional scooter wheel while the device has the added benefits of rear wheel steering. In another alternative, any of the above mentioned embodiments may be provided with a rear truck having a single wheel that provides for roll steering.

Furthermore, the device might be provided with a front wheel steering system as shown in FIG. 1 and with a single rear wheel or multiple rear wheels that do not provide any steering. In yet a further exemplary embodiment, either or both the front and rear trucks may carry more than two wheels.

In FIG. 5 of the drawings, there is depicted an alternative steering column configuration. In this configuration the upper race comprises conventional ball bearings with adjustment and locking nuts. The lower race comprises a plastics thrust bearing having inter-engaging frusto-conical bearing surfaces 72. This arrangement provides for adjustable resistance to rotating the steering column by tightening down the threaded ring at the upper bearing area. It also improves durability and vibration dampening.

What is claimed is:

1. A riding device for riding upon a surface, comprising:
a deck upon which a rider can be supported,
a rear road wheel or wheels attached to the deck,
a steering column having a longitudinal axis, the column being attached to the deck to pivot about said longitudinal axis, yet remain at a fixed angle with respect to the deck as the deck tilts in use,
a front truck supporting two laterally spaced front road wheels, the front truck being pivotally mounted to the steering column such that the front truck pivots about said longitudinal axis in unison with the steering column and pivots about an axis normal to said longitudinal axis such that the two front road wheels remain in contact with the surface upon tilting movement of the deck and steering column in use, the front truck and front road wheels providing no steering effect upon tilting of the deck and steering column in use unless the steering column is pivoted about said longitudinal axis.

2. The device of claim 1 comprising a pair of said rear road wheels pivotally attached to the deck and providing a steering effect upon tilting of the deck in use.

3. The device of claim 2 wherein the rear wheels are attached to a rear truck.

4. The device of claim 3 wherein the rear truck pivots about an inclined axis.

5. The device of claim 4 including a spring extending between the rear truck and the deck to bias the truck into a straight tracking alignment with the deck.

6. The device of claim 5 wherein the spring is a bar extending substantially longitudinally of the deck and located at a mid position thereof with respect to the deck.

7. A riding device for riding upon a surface, comprising:
a deck upon which a rider can be supported,
a rear road wheel or wheels attached to the deck,
a steering column having a longitudinal axis, the column being attached to the deck to pivot about said longitudinal axis, yet remain at a fixed angle with respect to the deck as the deck tilts in use,
a front truck supporting two laterally spaced front road wheels, the front truck being pivotally mounted to the steering column such that the front truck pivots about said longitudinal axis in unison with the steering column and pivots about an axis normal to said longitudinal axis such that the two front road wheels remain in contact with the surface upon tilting movement of the deck and steering column in use, the front truck receiving no transmission of torque from said steering column about said normal axis upon tilting of the deck and steering column in use, thereby promoting a balanced force distribution to each front road wheel in use.

8. The device of claim 7 comprising a pair of said rear road wheels pivotally attached to the deck and providing a steering effect upon tilting of the deck in use.

9. The device of claim 8 wherein the rear wheels are attached to a rear truck.

10. The device of claim 9 wherein the rear truck pivots about an inclined axis.

11. The device of claim 10 including a spring extending between the rear truck and the deck to bias the truck into a straight tracking alignment with the deck.

12. The device of claim 11 wherein the spring is a bar extending substantially longitudinally of the deck and located at a mid position thereof with respect to the deck.

* * * * *